United States Patent [19]

Ohtake et al.

[11] Patent Number: 4,852,080
[45] Date of Patent: Jul. 25, 1989

[54] ANALOG FRONT-END CIRCUIT FOR FULL-DUPLEX COMMUNICATION

[75] Inventors: Hisao Ohtake; Kazushige Yamamoto, both of Tokyo, Japan

[73] Assignee: Oki Electric Industry Co., Ltd., Tokyo, Japan

[21] Appl. No.: 217,765

[22] Filed: Jul. 1, 1988

[30] Foreign Application Priority Data

Jul. 6, 1987 [JP] Japan ................. 62-168011

[51] Int. Cl.[4] ............................................. H04B 1/50
[52] U.S. Cl. ...................................... 370/30; 333/173
[58] Field of Search ............... 370/30, 8; 379/98, 97; 330/310; 333/173

[56] References Cited

U.S. PATENT DOCUMENTS

| | | | |
|---|---|---|---|
| 3,881,158 | 4/1975 | Orchard et al. | 330/84 |
| 4,069,392 | 1/1978 | Goldenberg et al. | 178/58 |
| 4,455,539 | 6/1984 | Wurzburg | 333/173 |
| 4,476,448 | 10/1984 | Saari | 333/173 |
| 4,558,292 | 12/1985 | Sasaki et al. | 333/173 |

FOREIGN PATENT DOCUMENTS 57-15492  6/1982  Japan.
57-19526  7/1982  Japan.

OTHER PUBLICATIONS

Roubik Gregorian, Switched-Capacitor Filter Design Using Cascaded Sections, Jun. 1980, pp. 515-521, IEEE Transactions on Circuits and Systems.
R. W. Bigg, A New Modem for the Patel 2412 Service: Patel Modem, No. 12B, Post Off. Electr. Eng. J. (GB), vol. 70, pt 3, pp. 185-193.
IEEE Journal of Solid-State Circuits, vol. SC-21, No. 6, 12/86; "An Analog Front End for 2400-bit/s Split-Band Full-Duplex Modems", Yamamoto et al.

Primary Examiner—Douglas W. Olms
Assistant Examiner—Frederick R. Jorgenson
Attorney, Agent, or Firm—Spencer & Frank

[57] ABSTRACT

In the high-group passband filter of an analog front-end circuit for full-duplex communications, switches enable an all-pass filter, a high-pass filter, and a low-pass filter to be connected in the optimum series for different band assignments, thus improving S/N performance.

14 Claims, 5 Drawing Sheets

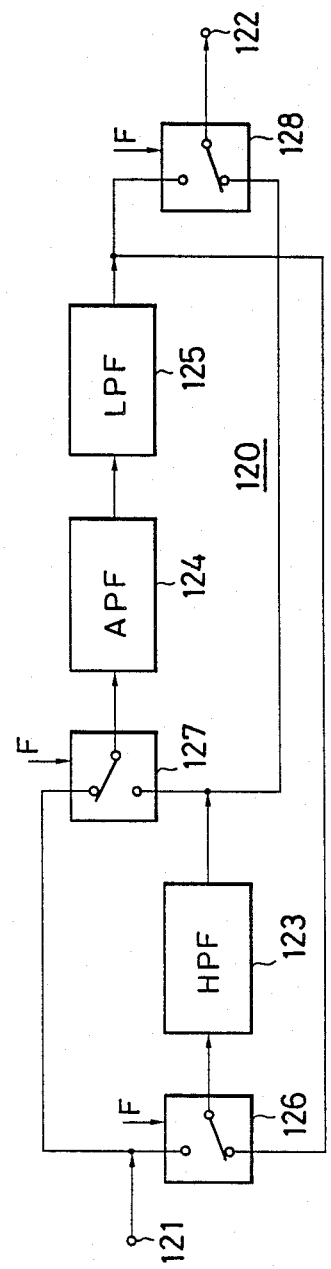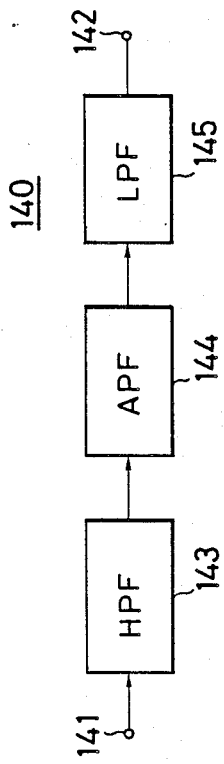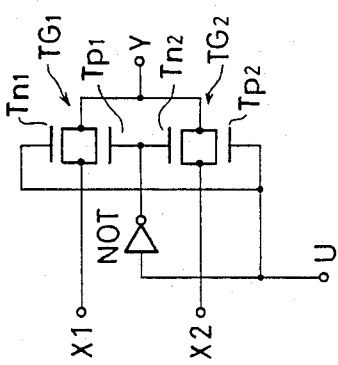

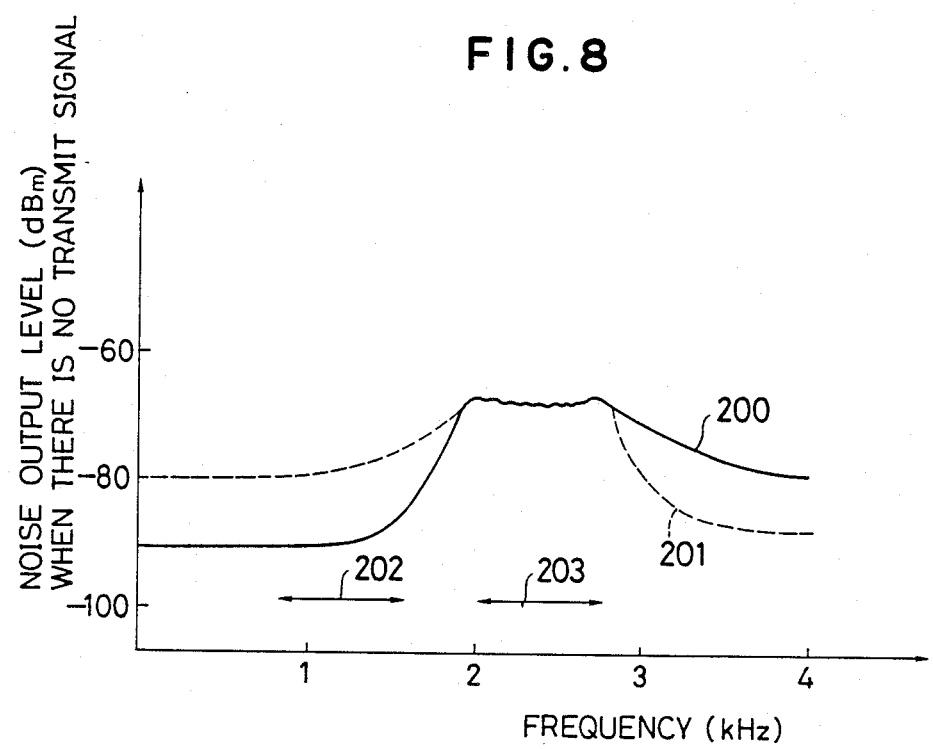

ANALOG FRONT-END CIRCUIT FOR FULL-DUPLEX COMMUNICATION

BACKGROUND OF THE INVENTION

This invention relates to a full-duplex analog front-end circuit for interfacing between a digital signal-processing section of a modem and an analog signal line.

The purpose of a modem is to enable a digital device such as a computer to send and receive signals on an analog line such as a telephone line. In a full-duplex modem, separate frequency bands within an available or allotted band or channel, i.e,, a higher band and a lower band within the allotted channel, are assigned, one for transmitting and the other for receiving so that communication can take place simultaneously in both directions. Moreover, it is desirable that one can switch the modem between a first mode in which the higher frequency band is assigned for transmitting and the lower frequency band is assigned for receiving, and a second mode in which the lower frequency band is assigned for transmitting and the higher frequency band is assigned for receiving.

FIG. 1 is a block diagram showing an example of an analog front-end circuit for a full-duplex modem 8. The part enclosed in the dotted line is the analog front-end circuit 10. The analog front-end circuit 10 is connected on one side of the modem's digital signal-processing section 9 which in turn is connected to a digital device such as a computer 1, and on the other side to a pair of gain amplifiers 20 and 21, which are further connected to a hybrid transformer 23. The hybrid transformer 23 couples the gain amplifiers 20 and 21 to an analog signal line such as a telephone line 2 in such a way that signal transfer does not occur from the gain amplifier 20 to the gain amplifier 21.

The analog front-end circuit 10 comprises a digital-to-analog (D/A) converter 11 that receives digital signals from the digital signal-processing section 9 and converts them to analog signals, and provides the analog signal to transmission signal input terminal 31, a high-group bandpass filter 12 for restricting the output of either D/A converter 11 or amplifier 21 to the higher frequency band, a gain amplifier 13, provides the signal to transmission signal output terminal 32 a low-group bandpass filter 14 which eliminates frequency components outside the desired lower frequency band, and an analog-to-digital (A/D) converter 15 which receives signals via receive signal output terminal 33 converts analog signals to digital signals, which are furnished to the digital signal-processing section 9.

The output of the gain amplifier 13 is connected to the input of the gain amplifier 20. The output of the gain amplifier 20 is coupled through the hybrid transformer 23 to the telephone line 2. The analog signal received from the telephone line 2 via the hybrid transformer 23 is amplified by the gain amplifier 21 and supplied to receive signal input terminal 34.

The analog front-end circuit 10 further comprises switches 16 to 19 which are controlled by a signal F from a switch controller 7 to assume either the state illustrated or the state opposite to that illustrated, thereby to switch the modem 8 between the above-mentioned first mode and the above-mentioned second mode.

More specifically, when the switches 16 to 19 are in the state illustrated, the high-group bandpass filter 12 receives the output of the D/A converter 11, and the output of the high-group bandpass filter 12 is passed through the gain amplifiers 13 and 20 to the hybrid transformer 23, and low-group bandpass filter 14 receives analog signals from the hybrid transformer 23 through the gain amplifier 21 and the output of the low-group bandpass filter 14 is furnished to the A/D converter 15. In this way, the high-group bandpass filter 12 is used for transmitting and low-group bandpass filter 14 is used for receiving.

When the switches 16 to 19 are in the state opposite to that illustrated, the output of the D/A converter 11 is applied to the low-group bandpass filter 14, and the output of the low-group bandpass filter 14 is passed through the gain amplifiers 13 and 20 to the hybrid transformer 23. The high-group bandpass filter 12 receives analog signals from the hybrid transformer 23 through the gain amplifier 21, and the output of the high-group bandpass filter 12 is furnished to the A/D converter 15. In this way, the low-group bandpass filter 14 is used for transmitting and the high-group bandpass filter 12 is used for receiving.

The analog front-end circuit 10 further comprises elements not shown in the drawing, such as an automatic gain control (AGC) circuit for controlling the amplitude of the output of the filter 12 or 14 being used for receiving, a carrier detector for receiving the output of the filter 12 or 14 being used for receiving and generating a carrier signal when the output level exceeds a certain threshold, and an output driver for driving the output of the A/D converter 15.

Both the high-group bandpass filter 12 and the low-group bandpass filter 14 comprise a low-pass filter (LPF), a high-pass filter (HPF), and an all-pass filter (APF), not shown in FIG. 1, connected in series. The cut-off frequencies of the LPF and HPF determine the passband of the filter. The function of the APF is to equalize the group delay.

When an analog front-end circuit 10 is implemented in an integrated circuit, switched-capacitor filters are used for the LPF, HPF, and APF of the high-group bandpass filter 12 and the low-group bandpass filter 14, because switched-capacitor filters lend themselves to integration. A problem, however, is that a switched-capacitor filter generates unwanted second-order harmonics. Another problem is that a switched-capacitor filter generates a nonnegligible amount of output noise even when it does not receive an input signal. These problems tend to be especially severe for all-pass filters. This degrades the signal-to-noise (S/N) ratio of the signal.

SUMMARY OF THE INVENTION

An object of this invention is to provide an analog front-end circuit for full-duplex communications with improved S/N characteristics.

An analog front end circuit for full-duplex communications according to this invention comprises a high-group bandpass filter and a low-group bandpass filter. The high-group bandpass filter comprises a low-pass filter, a high-pass filter, and an all-pass filter connected in series. The order of the series connection of the low-pass, high-pass, and all-pass filters can be changed by means of switches between a first state in which the high-group bandpass filter is most suitable for transmitting and a second state in which the high-group bandpass filter is most suitable for receiving. By selecting the optimum filter series for a particular communication mode, it is possible to improve the S/N ratio irrespective of whether the high-group bandpass filter is used for transmitting or for receiving, i.e., whether the modem is used in the first mode or the second mode.

BRIEF DESCRIPTION OF THE DRAWINGS

FIG. 2 is a block diagram showing an example of high-group bandpass filter according to the invention.

FIG. 6 is a diagram showing an example of a switch.

FIG. 7 is a diagram showing an example of a low-group bandpass filter.

FIG. 8 is a chart showing the noise output level characteristics of the high-group bandpass filter for different series of connections of the high-pass, low-pass, and all-pass filters.

DESCRIPTION OF THE PREFERRED EMBODIMENTS

Figure 1:
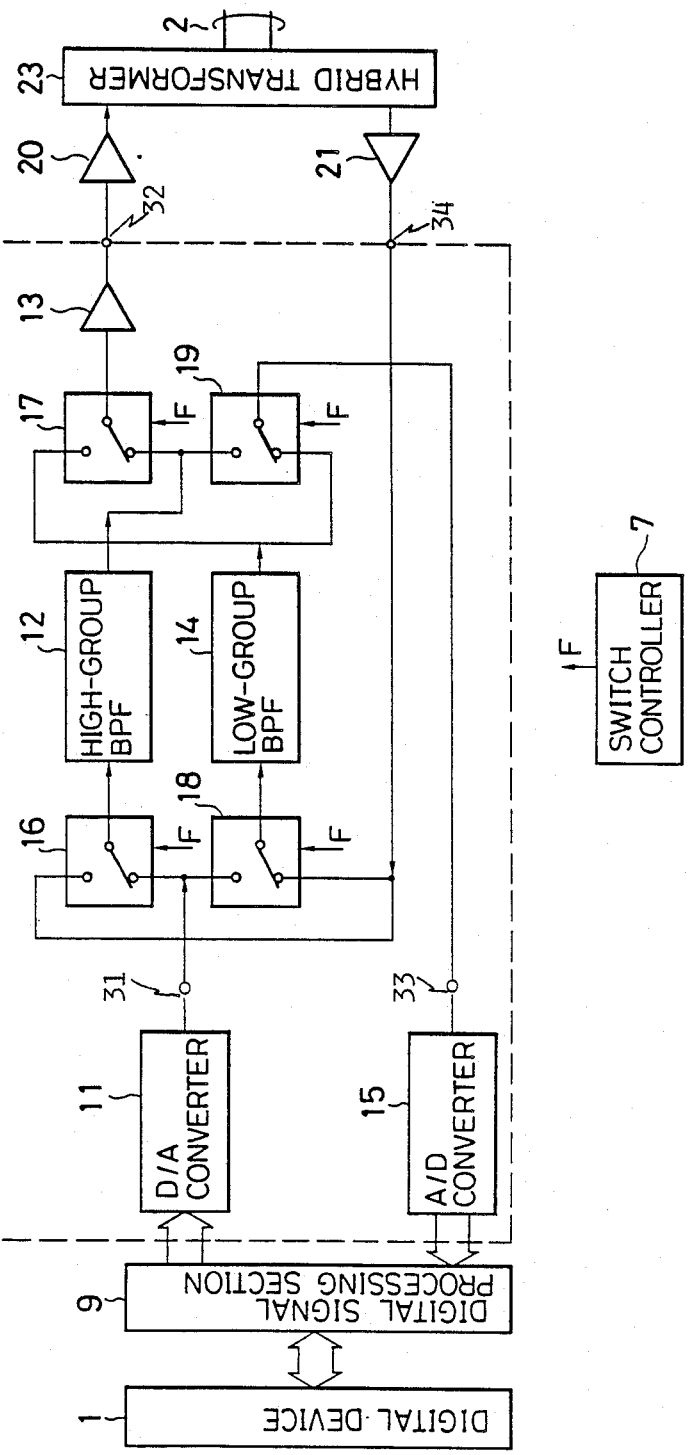
FIG. 1 is a block diagram showing an example of an analog front-end circuit for full-duplex communications.

The general structure of an analog front-end circuit of an embodiment of the invention is identical with that shown in FIG. 1. The difference between the present invention and the prior art circuit is found in the internal structure of the high-group bandpass filter 120, shown in FIG. 2. As illustrated in FIG. 2, the high-group bandpass filter 120 comprises a high-pass filter (HPF) 123, an all-pass filter (APF) 124, a low-pass filter (LPF) 125, and switches 126 to 128.

Figure 3:
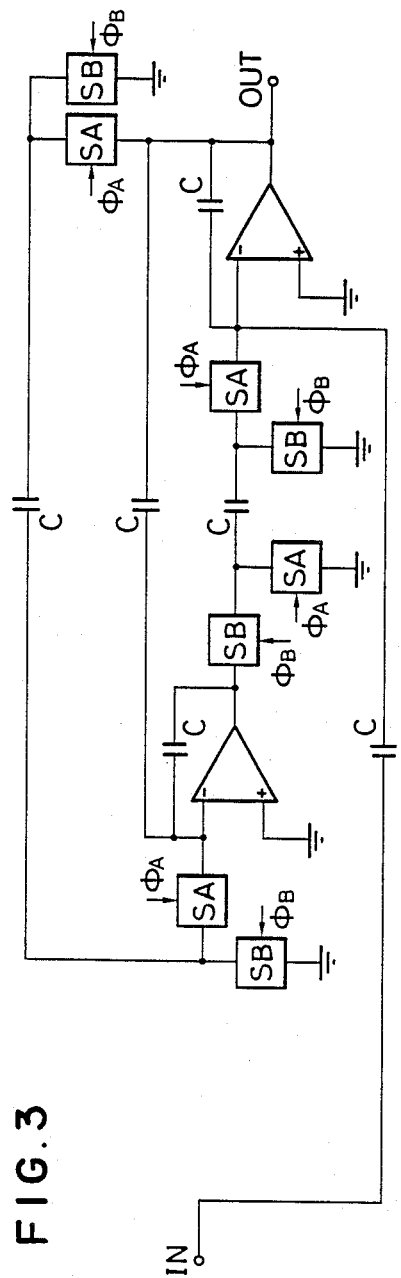
FIG. 3 is a diagram showing an example of a high-pass filter.

An example of the HPF 123 is shown in FIG. 3. As illustrated, it comprises cascaded switched-capacitor filters and eliminates the undesired lower frequency components of the analog signal input to it, i.e., either from the input terminal 121 or from the LPF 125.

Figure 4:
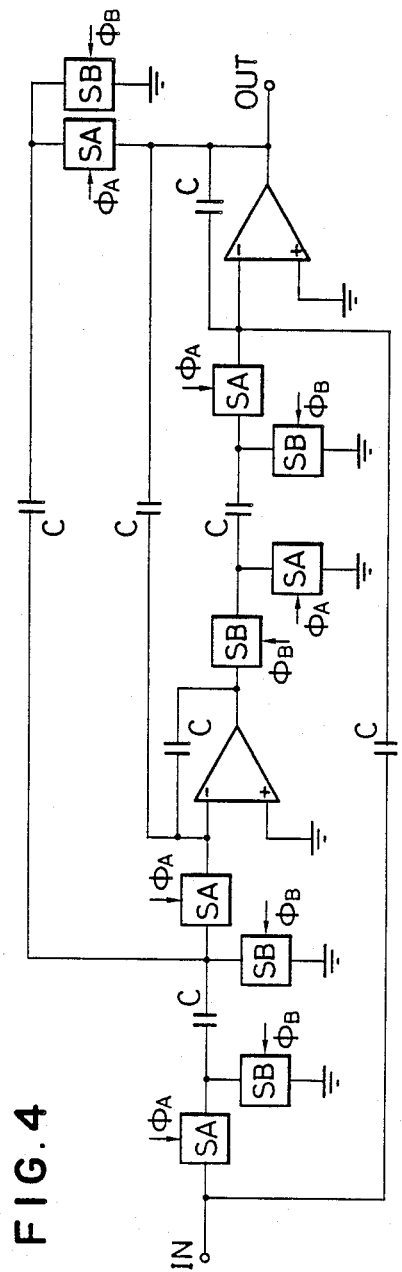
FIG. 4 is a diagram showing an example of a low-pass filter.

An example of the LPF 125 is shown in FIG. 4. As illustrated, it comprises cascaded switched-capacitor filters and elminates the undesired higher frequency components of the signals from the APF 124.

Figure 5:
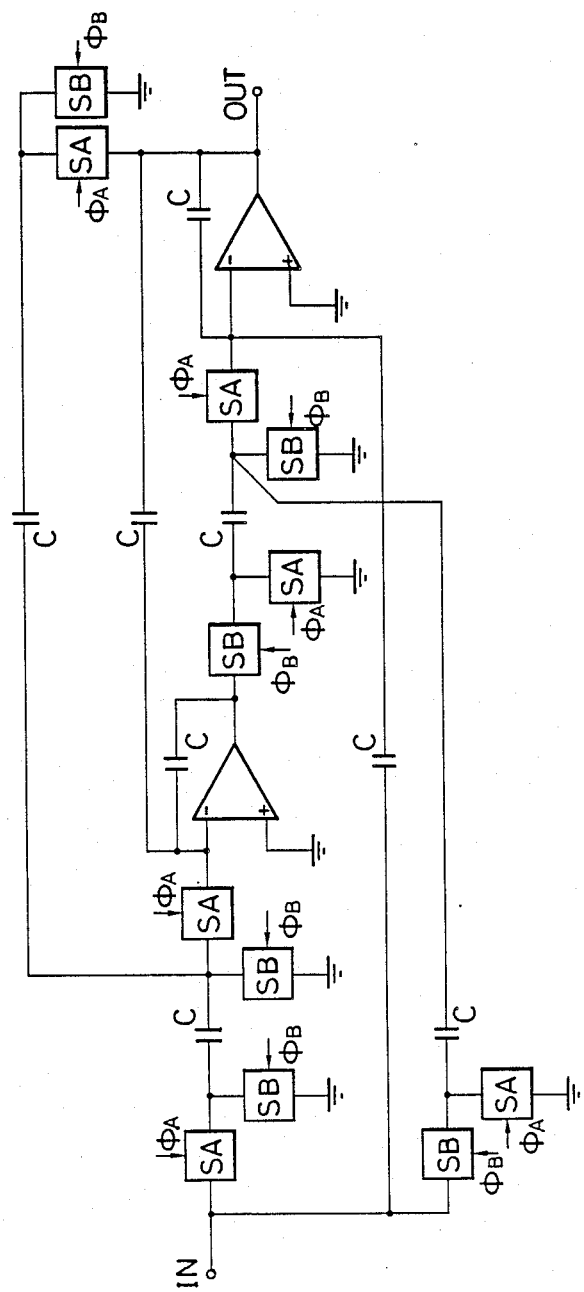
FIG. 5 is a diagram showing an example of an all-pass filter.

An example of the APF 124 is shown in FIG. 5. As illustrated, it comprises operational amplifiers, capacitors and MOS switches controlled by clock signals $\phi_A$, $\phi_B$. Its function is to equalize the overall delay of the signals throughout the high-group bandpass filter.

In each of the HPF 123, the LPF 125 and the APF 124, the switches SA to which clock signal $\phi_A$ is applied are closed when $\phi_A$ is high, and switches SB to which clock signal $\phi_B$ is applied are closed when $\phi_B$ is high. The clock signals $\phi_A$ and $\phi_B$ are substantially opposite in phase but there is a slight offset so that the switches SA and the switches SB are not "on" simultaneously.

Each of the switches 126 to 128 may comprise a circuit as shown in FIG. 6. As illustrated, the circuit comprises two input terminals X1 and X2, one output terminal Y, two transmission gates TG1 and TG2, each comprising a PMOS transistor Tp and NMOS transistor Tn connected in parallel with each other, a control terminal U receiving a control signal F, and an inverter NOT. The gate electrodes of the NMOS transistor Tn1 and PMOS transistor Tp2 are connected directly to the control terminal U while the gate electrodes of the NMOS transistor Tn2 and PMOS transistor Tp1 are connected through the inverter NOT to the control terminal U.

When the switches 126 to 128 are in the state illustrated, the analog signal applied to the input terminal 121 is passed through the APF 124, LPF 125 and HPF 123, in the stated order, to the output terminal 122. When the switches 126 to 128 are in the state opposite to that illustrated, the analog signal applied to the input terminal 121 is passed through the HPF 123, APF 124, and LPF 125, in the stated order, to the output terminal 122.

The low-group bandpass filter 140 can be identical to the low-group bandpass filter 14 of FIG. 1. An example of low-group bandpass filter 140 is shown in FIG. 7. As illustrated, it comprises an HPF 143, an APF 144 and an LPF 145.

The general structure of the HPF 143, the APF 144 and the LPF 145 can be the same as the HPF 123, the APF 124 and LPF 125 of the high-group bandpass filter 120. The HPF 143 and the LPF 145 differ from the HPF 123 and the LPF 125 in the capacitances of the capacitors and hence the cut-off frequencies. An analog signal applied to an input terminal 141 is passed through the HPF 143, APF 144 and LPF 145, in the stated order, to an output terminal 142. This order of passage is unchanged irrespective of whether the low-group bandpass filter 140 is used for transmitting or receiving.

When the analog front-end circuit 10 is used in the second mode in which the low-group bandpass filter 140 is assigned for transmitting and the high-group bandpass filter 120 is assigned for receiving, the switches 126 to 128 as well as the switches 16 to 19 are in the state opposite to that illustrated.

In this state, the noise generated by the APF 144 in the low-group bandpass filter 140 is restricted by the LPF 145 to the low-group passband. If the output of the low-group bandpass filter 140 invades the high-group bandpass filter 120, it is attenuated by the HPF 123 in the high-group bandpass filter 120 before it reaches the APF 124, so it does not degrade the S/N ratio of the received signal by causing the APF 124 to generate second-order harmonics in the high-group receiving band.

If the component filters of the high-group bandpass filter 120 being used for receiving were connected in the series APF 124→LPF 125→HPF 123, then the APF 124 in the high-group bandpass filter 120 would generate second-order harmonics which may fall within the passband of the HPF 123. These harmonics would show up in the output of the high-group bandpass filter 120, where they would degrade the signal-to-noise (S/N) ratio of the received signal.

When the analog front-end circuit 10 of the above embodiment is used in the first mode in which the high-group bandpass filter is assigned for transmitting and the low-group bandpass filter is assigned for receiving, the switches 126 to 128 as well as the switches 16 to 19 are in the state illustrated.

With the filter series being APF 124→LPF 125→HPF 123, the noise in the lower frequency band that is generated by the high-group bandpass filter 120 is smaller than if the filter series is the HPF 123→the APF 124→the LPF 125. This is because the noise generated by the APF 124 is restricted by the HPF 123 to the high-group passband. Both this noise and the additional second-order harmonics generated by the APF 144 in the low-group bandpass filter 140 lie above the cut-off frequency of the LPF 145 and are therefore attenuated by the LPF 145.

Thus, even if the noise invades the receive section, the level of the noise is low and the noise does not degrade the S/N characteristic of the received signal.

The level of the noise generated by the high-group bandpass filter 120 with different series of connections are shown in FIG. 8. The horizontal axis in FIG. 8 indicates frequency in kilohertz (kHz); the vertical axis indicates the noise output level in decibels when there is no transmit signal. The noise level characteristics shown were measured at the output of the gain amplifier 13, which had a gain of approximately 14 dB. The solid line 200 in FIG. 8 shows the noise characteristic when the filter series of the high-group bandpass filter 120 being used for transmitting was APF 124→LPF 125→HPF 123. The dashed line 201 shows the noise characteristic when the filter series was switched to HPF 123→APF 124→LPF 125. In the passband 202 of the low-group bandpass filter being used for receiving, the noise level shown by the solid line 200 is about 10 dB lower than the noise level illustrated by the dashed line 201. Accordingly, when the high-group band is assigned for transmitting, the filter series of the high-group bandpass filter should be APF→LPF→HPF. Then the level of the noise which may invade the low-group bandpass filter being used for receiving is low.

Thus by switching the filter sequence according to the communication mode, this invention can provide both the optimum filter series, regardless of how the high-group band and low-group band are assigned.

This invention is not limited to the foregoing embodiment. In particular, it is possible for the insertion positions and connection configurations of the switches 16, 17, 18, 19, 126, 127, and 128 to be other than shown, and it is possible to provide a plurality of high-group bandpass filters 120 and a plurality of low-group bandpass filters 14 for bidirectional communication using more than two frequency channels.

What is claimed is:

1. An analog front-end circuit for full-duplex communications comprising:
    a transmission signal input terminal and a transmission signal output terminal, a receive signal input terminal and a receive signal output terminal;
    a high-group bandpass filter including a high-pass filter, a low-pass filter and an all-pass filter;
    a low-group bandpass filter having a lower passband than said high-group bandpass filter;
    first switch means for switching the high-group bandpass filter and the low-group bandpass filter between a first mode in which the high-group bandpass filter is connected between said transmission input terminal and said transmission output terminal and the low-group bandpass filter is connected between said receive input terminal and said receive output terminal, and a second mode in which the low-group bandpass filter is connected between said transmission input terminal and said transmission output terminal and the high-group bandpass filter is connected between said receive input terminal and said receive output terminal; and
    second switch means for switching the high-pass filter, the low-pass filter and the all-pass filter in the high-group bandpass filter between a first state and a second state; wherein
    said second switch means connects the high-pass filter, the low-pass filter and the all-pass filter so that the input signal to the high-group bandpass filter is passed through the all-pass filter, the low-pass filter and the high-pass filter, in the stated order, when the high-group bandpass filter is in said first state, and connects the high-pass filter, the low-pass filter and the all-pass filter so that said input signal to the high-group bandpass filter is passed through the high-pass filter before the all-pass filter, when the high-group bandpass filter is in said second state, and
    said high-group bandpass filter is most suitable for transmitting when in said first state and for receiving when in said second state.

2. A circuit according to claim 1, wherein said second switch means connects the high-pass filter, the low-pass filter and the all-pass filter so that the input signal to the high-group bandpass filter is passed through the high-pass filter, the all-pass filter and the low-pass filter, in the stated order, when the high-group bandpass filter is used for receiving.

3. A circuit according to claim 1, wherein the low-group bandpass filter comprises a second low-pass filter, a second high-pass filter and a second all-pass filter.

4. A circuit according to claim 3, wherein the input signal to the low-group bandpass filter is passed through said second high-pass filter, said second all-pass filter and said second low-pass filter in the stated order.

5. A circuit according to claim 3, wherein said low-pass, high-pass, and all-pass filters are switched-capacitor filters.

6. A circuit according to claim 1, wherein said second switch means further includes:
    a switch input terminal;
    a switch output terminal;
    first internal switch means for selectively connecting said high-pass filter to said low-pass filter or to said switch input terminal;
    second internal switch means for selectively connecting said all-pass filter to said switch input terminal or to said high-pass filter; and
    third internal switch means for selectively connecting said switch output terminal to said high-pass filter or to said low-pass filter.

7. A circuit according to claim 6, wherein each of said internal switches includes:
    first and second inputs;
    an output;
    a control terminal; and
    first and second transmissions gates; wherein
    said first input is connected to said first gate;
    said second input is connected to said second gate;
    said output is connected to both of said gates; and
    said control terminal is connected to each of said gates for causing one of said gates to connect one of said input terminals to said output terminal while preventing said other gate from connecting the other of said input terminals to said output terminal.

8. A system for interfacing a digital signal processor and an analog signal line, comprising:
    a D/A converter connected to said digital signal processor for converting a first digital signal from said digital signal processor into a first analog signal;
    a hybrid transformer connected to said analog signal line for transmitting and receiving a line signal to and from said analog signal line;

an analog front-end circuit for receiving said first analog signal, producing a transmit signal and providing said transmit signal to said hybrid transformer;

said analog front-end circuit also receiving a receive signal from said hybrid transformer and producing a second analog signal; and an A/D converter for receiving and converting said second analog signal into a digital signal and providing it to said digital signal processor;

wherein said analog front-end circuit comprises:

a high-group bandpass filter including a high-pass filter, a low-pass filter and an all-pass filter;

a low-group bandpass filter having a lower passband than the high-group bandpass filter;

first switch means for switching the high-group bandpass filter and the low-group bandpass filter between a first mode in which the high-group bandpass filter connects said D/A converter to said hybrid transformer and the low-group bandpass filter connects said hybrid transformer to said A/D converter, and a second mode in which the low-group bandpass filter connects said D/A converter to said hybrid transformer and the high-group bandpass filter connects said hybrid transformer to said A/D converter; and second switch means for switching the high-pass filter, the low-pass filter and the all-pass filter in the high-group bandpass filter between a first state in which the high-group bandpass filter is most suitable for said first mode and a second state in which the high-group bandpass filter is most suitable for said second mode; wherein said second switch means connects the high-pass filter, the low-pass filter and the all-pass filter so that the input signal to the high-group bandpass filter is passed through the all-pass filter, the low-pass filter and the high-pass filter, in the stated order, when the high-group bandpass filter is in said first state, and connects the high-pass filter, the low-pass filter and the all-pass filter so that said input signal to the high-group bandpass filter is passed through the high-pass filter before the all-pass filter, when the high-group bandpass filter is in said second state.

9. A circuit according to claim 8, wherein said second switch means connects the high-pass filter, the low-pass filter and the all-pass filter so that the input signal to the high-group bandpass filter is passed through the high-pass filter, the all-pass filter and the low-pass filter, in the stated order, when the high-group bandpass filter is in said second state.

10. A circuit according to claim 8, wherein the low-group bandpass filter comprises a second low-pass filter, a second high-pass filter and a second all-pass filter.

11. A circuit according to claim 10, wherein the input signal to the low-group bandpass filter is passed through the high-pass filter, the all-pass filter and the low-pass filter in the stated order.

12. A circuit according to claim 8, wherein said low-pass, high-pass, and all-pass filters are switched-capacitor filters.

13. A circuit according to claim 8, wherein said second switch means further includes:

a switch input terminal for receiving said first analog signal;

a switch output terminal for providing said transmit signal;

first internal switch means for selectively connecting said high-pass filter to said low-pass filter or to said switch input terminal;

second internal switch means for selectively connecting said all-pass filter to said switch input terminal or to said high-pass filter; and third internal switch means for selectively connecting said switch output terminal to said high-pass filter or to said low-pass filter.

14. A circuit according to claim 13, wherein each of said internal switches includes:

first and second inputs;

an output;

a control terminal; and first and second transmissions gates; wherein said first input is connected to said first gate;

said second input is connected to said second gate;

said output is connected to both of said gates; and said control terminal is connected to each of said gates for causing one of said gates to connect one of said input terminals to said output terminal while preventing said other gate from connecting the other of said input terminals to said output terminal.

* * * * *